US012798589B2

(12) United States Patent
Cai et al.

(10) Patent No.: US 12,798,589 B2
(45) Date of Patent: Nov. 17, 2026

(54) COMPLEX NETWORK-BASED COMPLEX ENVIRONMENT MODEL, COGNITION SYSTEM, AND COGNITION METHOD OF AUTONOMOUS VEHICLE

(71) Applicant: JIANGSU UNIVERSITY, Zhenjiang (CN)

(72) Inventors: Yingfeng Cai, Zhenjiang (CN); Chenglong Teng, Zhenjiang (CN); Xiaoxia Xiong, Zhenjiang (CN); Hai Wang, Zhenjiang (CN); Xiaodong Sun, Zhenjiang (CN); Qingchao Liu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 936 days.

(21) Appl. No.: 17/802,143

(22) PCT Filed: Jan. 7, 2022

(86) PCT No.: PCT/CN2022/070671
§ 371 (c)(1),
(2) Date: Aug. 25, 2022

(87) PCT Pub. No.: WO2022/237212
PCT Pub. Date: Nov. 17, 2022

(65) Prior Publication Data

US 2024/0190442 A1 Jun. 13, 2024

(30) Foreign Application Priority Data

May 10, 2021 (CN) ......................... 202110504041.4

(51) Int. Cl.
*B60W 40/09* (2012.01)
*B60W 40/107* (2012.01)

(52) U.S. Cl.
CPC .......... *B60W 40/09* (2013.01); *B60W 40/107* (2013.01); *B60W 2520/105* (2013.01); *B60W 2540/30* (2013.01)

(58) Field of Classification Search
CPC .......................... B60W 40/09; B60W 2540/30
See application file for complete search history.

(56) References Cited

U.S. PATENT DOCUMENTS

2010/0023223 A1* 1/2010 Huang .................. B60W 40/09 340/576
2019/0004526 A1* 1/2019 Soliman ............... B62D 15/025

FOREIGN PATENT DOCUMENTS

CN 101633359 A 1/2010
CN 103077603 A 5/2013
(Continued)

*Primary Examiner* — Imran K Mustafa
(74) *Attorney, Agent, or Firm* — Bayramoglu Law Offices LLC

(57) ABSTRACT

Based on a perception of an external environment of an autonomous vehicle, a driving style is recognized according to driving characteristic parameters indicating a driving aggressiveness degree and a mode shift preference, in response to a complexity of an individual driving behavior cognition. After the driving style is recognized, in accordance with group behavior characteristics of the motion bodies in the environment, a time-varying complex dynamical network is established based on a complex network with the motion bodies as nodes and roads as constraints, to serve as a complex environment model of the autonomous vehicle. Finally, the nodes in the complex environment model are parametrically represented to realize the node difference cognition of the complex environment. The nodes in the complex environment model are hierarchized by using an agglomerative algorithm to realize the hierarchical cognition of the complex environment.

8 Claims, 3 Drawing Sheets

(56) References Cited

FOREIGN PATENT DOCUMENTS

| | | | |
|---|---|---|---|
| CN | 106023344 | A | 10/2016 |
| CN | 109144076 | A | 1/2019 |
| CN | 109927725 | A | 6/2019 |
| CN | 110321954 | A | 10/2019 |
| CN | 113406955 | A | 9/2021 |

* cited by examiner

COMPLEX NETWORK-BASED COMPLEX ENVIRONMENT MODEL, COGNITION SYSTEM, AND COGNITION METHOD OF AUTONOMOUS VEHICLE

CROSS REFERENCES TO THE RELATED APPLICATIONS

The application is the national phase entry of International Application No. PCT/CN2022/070671, filed on Jan. 7, 2022, which is based on and claims priority to Chinese patent application No. 202110504041.4, filed on May 10, 2021, the entire contents of which are incorporated herein by reference.

TECHNICAL FIELD

The present disclosure relates to the technical field of autonomous vehicle applications, and in particular, to a complex network-based complex environment model, cognition system, and cognition method of an autonomous vehicle.

BACKGROUND

A complex network is a network with high complexity, which is an abstraction of a complex system, generally with some or all of the following properties: self-organization, self-similarity, attractor, small-world, and scale-free. The complex network is characterized by large network size, complex connection structure, node complexity (for example, node dynamics complexity and node diversity), complex network spatio-temporal evolution, sparse network connections, and fusion of multiple complexities, etc. Research methods for complexity of a complex network, such as node complexity, connection structure complexity, and complexity of network spatio-temporal evolution, have become important tools for complex system modeling and research.

An autonomous vehicle is an integrated system that combines environmental sensing, planning and decision making, control and execution, and other functions. Due to the rapid development of sensor technologies such as LIDAR, millimeter wave radar, and camera, environmental perception methods have been deeply researched and have made great progress. At present, to establish the correlation between underlying perception information of the environment, such as individual type, position as well as motion, and cognition of individual behavior style, hierarchical local environment, and global environment, to support the development from environment perception to individual cognition, local cognition to global cognition of integrated traffic situation, has become an important prerequisite to ensure the safety of autonomous decision making and motion planning of the autonomous vehicle. However, the environment faced by the autonomous vehicle is a complex system, in which the motion behavior of an individual not only depends on the individual itself, but also is influenced by motion behaviors of other individuals around and the driving environment, and has complex multidimensional coupling and dynamic uncertainty. Therefore, to establish a complex environment model, and a cognition method and apparatus of an autonomous vehicle based on a complex network, so as to reveal the nonlinear dynamic evolution law of the environment faced by the autonomous vehicle has become an important part of the solution to the environmental cognition of high-level autonomous driving.

SUMMARY

To solve the above technical problems, the present disclosure provides a complex network-based complex environment model, cognition system, and cognition method of an autonomous vehicle. Based on the perception of an external environment of an autonomous vehicle, a driving style is recognized according to driving characteristic parameters indicating a driving aggressiveness degree and mode shift preference, in response to the complexity of individual driving behavior cognition. Secondly, after the driving style is recognized, in accordance with group behavior characteristics of the motion bodies in the environment, a time-varying complex dynamical network is established based on a complex network with the motion bodies as nodes and roads as constraints, to serve as a complex environment model of the autonomous vehicle. Finally, the nodes in the complex environment model are parametrically represented to realize the node difference cognition of the complex environment. The nodes in the complex environment model are hierarchized by using an agglomerative algorithm to realize the hierarchical cognition of the complex environment. A method for measuring a disorder degree of the complex environment model is established, to realize global risk cognition of the complex environment.

The complex network-based cognition system of an autonomous vehicle according to the present disclosure includes: a driving style recognition module, a complex environment model module, a node difference cognition module, a hierarchical cognition module, and a global risk cognition module.

The driving style recognition module is configured to construct a driving style characteristic matrix $C_J$ based on extraction of driving characteristic parameters, input the driving style characteristic matrix $C_J$ to a random forest classifier $R_f$, and output a driving style category $K_{drive}$ through the random forest classifier $R_f$.

The driving characteristic parameters include a longitudinal driving characteristic parameter, a lateral driving characteristic parameter, and a mode shift characteristic parameter. The longitudinal driving characteristic parameter refers to a longitudinal acceleration $a_+$ and a vehicle-following time interval $d_{time}$ within a limited time window; the lateral driving characteristic parameter refers to a lateral acceleration root mean square RMS($a_-$) and a yaw angular velocity standard deviation SD(r) within a limited time window; and the mode shift characteristic parameter refers to a left-lane-switching state transfer probability $P(l_c)$ and a right-lane-switching state transfer probability $P(r_c)$ within a limited time window.

The driving style characteristic matrix $C_J$ is a 3D characteristic matrix with six degrees of freedom consisting of the longitudinal driving characteristic parameter, the lateral driving characteristic parameter, and the mode shift characteristic parameter:

$$C_J = \begin{bmatrix} a_+, d_{time} \\ \text{RMS}(a_-), SD(r) \\ P(l_c), P(r_c) \end{bmatrix} \quad (1)$$

The random forest classifier $R_f$ is generated through the following steps: performing random sampling with replacement on an original training set consisting of driving style data, to generate training sets; selecting n characteristics for each training set, and training m decision tree classification models separately; for each decision tree classification model, selecting a best sample characteristic according to an information gain ratio and splitting the best sample characteristic, until all training samples belong to a same category; finally, combining all the generated decision tree classification models to form a random forest, and outputting the driving style category $K_{drive}$ through a voting method.

The driving style category $K_{drive}$ includes an aggressive category, a peaceful category, and a conservative category:

$$K_{drive} = R_f(C_J) \tag{2}$$

The complex environment model module is configured to construct a time-varying complex dynamical network G as a complex environment model based on a complex network theory and by using motion bodies as nodes, in order to characterize a stochastic, dynamic and nonlinear evolution law of the complex environment of the autonomous vehicle:

$$G = (V, B, X, P, \Theta) \tag{3}$$

where G is the time-varying complex dynamical network; V is a set of the nodes in the time-varying complex dynamical network G; B is a set of edges in the time-varying complex dynamical network G, and represents inter-node connection lines; X is a state vector of a node in the time-varying complex dynamical network G; P is an intensity function of an edge in the time-varying complex dynamical network G, and represents an inter-node coupling relationship; Θ is an area function of the time-varying complex dynamical network G, and represents a dynamic constraint for the time-varying complex dynamical network G.

The time-varying complex dynamical network G is equated to a continuous-time dynamical system with N nodes; assuming that a state variant of an i-th node is $x_i$, a kinetic equation of the i-th node is:

$$i.\dot{x}_i = f(x_i) + \xi\sum_{j=1}^{N} p_{ij}(t)H(x_j),\ (i = 1, 2, \ldots, N) \tag{4}$$

where $f(x_i)$ is an argument function of the state variant of the i-th node; ξ>0 is a strength coefficient of a common connection relation; $p_{ij}(t)$ is a coupling coefficient between the i-th node and a j-th node; $H(x_j)$ is an inter-node inline function, and is a function about a driving style and a node distance.

It is defined that $X=[x_1, x_2, \ldots, x_N]^T$, $F(X)=[f(x_1), f(x_2), \ldots, f(x_N)]^T$, $P(t)=[(p_{ij}(t))]\in R^{N\times N}$, and $H(X)=[H(x_1), H(x_2), \ldots, H(x_N)]^T$; in this case, a node system kinetic equation of the time-varying complex dynamical network G is as follows:

$$i.\dot{X} = F(X) + \xi P(t)H(X) \tag{5}$$

where X is the state vector of the node in the time-varying complex dynamical network G; F(X) is a dynamical equation vector of the node in the time-varying complex dynamical network G; P(t) is a coupling matrix of the nodes in the time-varying complex dynamical network G; H(X) is a node inline vector in the time-varying complex dynamical network G.

In the complex environment model, with the movement of nodes and change of the environment, positions and states of the nodes change dynamically, and there are nodes entering and flowing out of the network; thus, the inter-node coupling relationship and the area function of the network change accordingly, and the complex network system continuously evolves over time.

The node difference cognition module is configured to express differences of the network nodes by using four parameters of the nodes in the complex environment model: measure $g_i$, degree $k_i$, node weight $s_i$, and importance I(i), and perform differentiated analysis on all the nodes by using a normal distribution graph.

The measure $g_i$ of the node is represented by using a structure size of the i-th node.

The degree $k_i$ of the node is represented by using a quantity of nodes directly connected to the i-th node.

The node weight $s_i$ of the node represents a sum of edge weights of all neighboring edges of the i-th node.

The importance I(i) of the node is as follows:

$$I(i) = K(i) + \sum_j p_{ij}(t) \tag{6}$$

where in formula (6), $p_{ij}(t)$ is an inter-node coupling coefficient, and K(i) is a degree centrality factor of the i-th node; and $$K(i) = \frac{k_i w_{ij}}{\langle k\rangle \overline{U}} \tag{7}$$

where in formula (7), $\langle k\rangle=\Sigma k_i/N$, and represents an average degree of the module; and $\overline{U}=\Sigma(s_i/k_i)/N$, and represents an average unit weight of the module.

The hierarchical cognition module is configured to hierarchize the nodes in the complex environment model by using an agglomerative algorithm, to implement hierarchical, stepped cognition of the complex environment of the autonomous vehicle, where operation steps are as follows:

Step I: with the autonomous vehicle as a central node, forming an inner layer module by using the central node and nodes having a coupling relationship with the central node;

Step II: sorting importance of non-central nodes in the inner layer module, and looking for a node with a maximum coupling coefficient sequentially, to form an intermediate layer module;

Step III: sorting importance of the nodes in the intermediate layer module, and looking for a node with a maximum coupling coefficient sequentially, to form an outer layer module; and Step IV: forming an edge layer module by using other nodes.

The global risk cognition module is configured to measure a disorder degree of the complex environment model by using system entropy and an entropy change according to a basic idea of an entropy theory, and describe an overall risk and changing trend, to implement global common state cognition.

The system entropy is as follows:

$$S = V_n / \Theta + D(P) + D(U) \tag{8}$$

where $V_n$ is a quantity of nodes in the complex environment model, Θ is a network area of the complex environment model, D(P) represents a variance of coupling coefficients, and D(U) is a variance of speeds of the nodes in the complex environment model.

The entropy change is as follows:

$$dS = d\left(\frac{V_n}{\Theta}\right) + d(D(P)) + d(D(U)) \tag{9}$$

where d represents a differential of a corresponding variant, and represents a change trend of the variant.

According to the foregoing complex network-based cognition system of an autonomous vehicle, a cognition method of an autonomous vehicle provided by the present disclosure includes the following steps:

step 1): extracting a longitudinal driving characteristic parameter, a lateral driving characteristic parameter, and a mode shift characteristic parameter, constructing a driving style characteristic matrix $C_J$, generating a random forest classifier $R_f$, inputting the driving style characteristic matrix $C_J$ into the random forest classifier $R_f$, outputting a driving style category $K_{drive}$ through the random forest classifier $R_f$, and recognizing a driving style as an aggressive category, a peaceful category, or a conservative category;

step 2): constructing a time-varying complex dynamical network G as a complex environment model, to describe overall correlation characteristics of a complex environment; further establishing a node kinetic equation in the complex environment model; then combining a dynamical equation vector F(X) of all the nodes in the time-varying complex dynamical network G, a coupling matrix P(t) of the nodes in the time-varying complex dynamical network G, and a node inline vector H(X), to establish a node system kinetic equation of the time-varying complex dynamical network G to describe dynamic characteristics of the complex environment;

step 3): constructing four parameters of the nodes in the complex environment model: measure $g_i$, degree $k_i$, node weight $s_i$, and importance I(i), and performing differentiated analysis on the nodes by using a normal distribution graph, to implement differentiated cognition of the nodes;

step 4): hierarchizing the nodes in the complex environment model by using an agglomerative algorithm, to implement hierarchal, stepped cognition of the complex environment of the autonomous vehicle; and step 5): measuring a disorder degree of the complex environment model by using system entropy and an entropy change according to a basic idea of an entropy theory, and describing an overall risk and changing trend, to implement global common state cognition.

In the present disclosure, based on the perception of an external environment of an autonomous vehicle, a driving style is recognized according to driving characteristic parameters indicating a driving aggressiveness degree and mode shift preference, in response to the complexity of individual driving behavior cognition. Secondly, after the driving style is recognized, in accordance with group behavior characteristics of the motion bodies in the complex environment, a time-varying complex dynamical network G is constructed based on a complex network with the motion bodies as nodes and roads as constraints, to serve as a complex environment model of the autonomous vehicle. Finally, the nodes in the complex environment model are parametrically represented to realize the node difference cognition of the complex environment. The nodes in the complex environment model are hierarchized by using an agglomerative algorithm to realize the hierarchical cognition of the complex environment. A method for measuring a disorder degree of the complex environment model is established, to realize global risk cognition of the complex environment, thereby establishing a complex network-based complex environment model, cognition method, and cognition apparatus of an autonomous vehicle, to lay a solid foundation for the design of safe driving and control strategies of the autonomous vehicle.

The present disclosure has the following beneficial effects.

1. The present disclosure establishes a driving style recognition method. A driving style characteristic matrix $C_J$ is constructed based on extraction of driving characteristic parameters, the driving style characteristic matrix $C_J$ is inputted to a random forest classifier $R_f$, and the random forest classifier $R_f$ outputs a driving style category $K_{drive}$, to implement driving style recognition.
2. In the present disclosure, based on a complex network theory, a time-varying complex dynamical network G is constructed as a complex environment model by using motion bodies as nodes, which characterizes a stochastic, dynamic and nonlinear evolution law of the complex environment of the autonomous vehicle. A node system kinetic equation of the time-varying complex dynamical network G is further established, to describe the dynamic characteristics of the complex environment.
3. In the present disclosure, four parameters of the nodes in the complex environment model: measure $g_i$, degree $k_i$, node weight $s_i$, and importance I(i), are constructed, and differentiated analysis is performed on the nodes by using a normal distribution graph, to implement differentiated node cognition of the complex environment of the autonomous vehicle.
4. In the present disclosure, the nodes in the complex environment model are hierarchized by using an agglomerative algorithm, to implement hierarchal, stepped cognition of the complex environment of the autonomous vehicle.
5. In the present disclosure, system entropy and an entropy change of the complex environment model of the autonomous vehicle are constructed to measure a disorder degree of the complex environment model, and an overall risk and changing trend are described, to implement global common state cognition for the complex environment of the autonomous vehicle.

DETAILED DESCRIPTION OF THE EMBODIMENTS

The present disclosure will be further described below with reference to the accompanying drawings.

Figure 1:
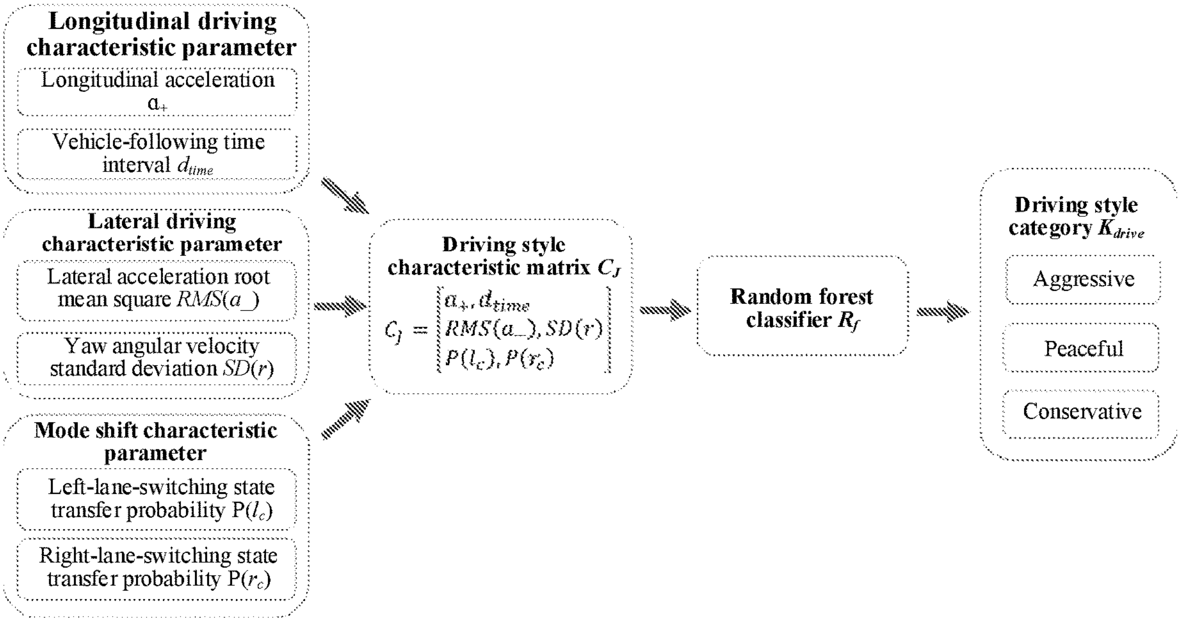
FIG. 1 is a flowchart of a driving style recognition module structure.

FIG. 1 is a structural flowchart of a driving style recognition module. First, a longitudinal driving characteristic parameter, a lateral driving characteristic parameter, and a mode shift characteristic parameter are extracted. The longitudinal driving characteristic parameter refers to a longitudinal acceleration $a_+$ and a vehicle-following time interval $d_{time}$ within a limited time window; the lateral driving characteristic parameter refers to a lateral acceleration root mean square RMS($a\_$) and a yaw angular velocity standard deviation SD(r) within a limited time window; and the mode shift characteristic parameter refers to a left-lane-switching state transfer probability $P(l_c)$ and a right-lane-switching state transfer probability $P(r_c)$ within a limited time window. Next, a driving style characteristic matrix $C_J$ is constructed, where the driving style characteristic matrix $C_J$ is a 3D characteristic matrix with six degrees of freedom consisting of the longitudinal driving characteristic parameter, the lateral driving characteristic parameter, and the mode shift characteristic parameter. Then, the driving style characteristic matrix $C_J$ is inputted to the random forest classifier $R_f$, and a driving style category $K_{drive}$ is outputted, where the driving style category $K_{drive}$ includes an aggressive category, a peaceful category, and a conservative category, to implement driving style recognition.

Figure 2:
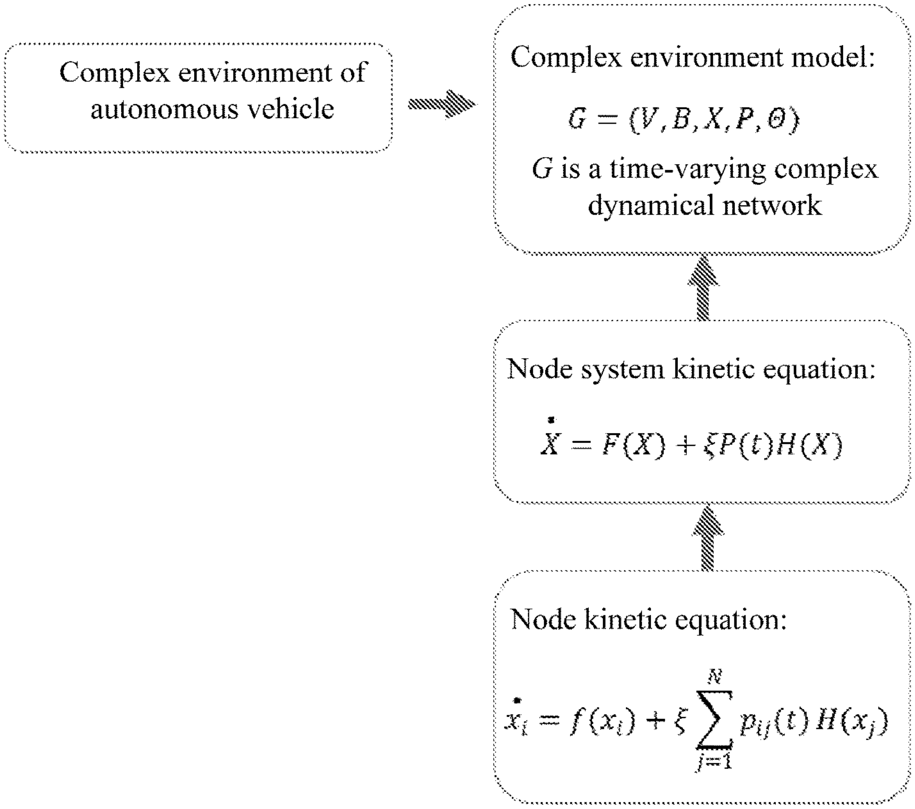
FIG. 2 is a flowchart of a complex environment model module structure of an autonomous vehicle.

FIG. 2 is a structural flowchart of a complex environment model module of an autonomous vehicle. Step 1, a time-varying complex dynamical network G is constructed as a complex environment model: G=(V, B, X, P, Θ). Step 2, the time-varying complex dynamical network G is equated to a continuous-time dynamical system with N nodes, to establish a node kinetic equation:

$$\dot{x}_i = f(x_i) + \xi \sum_{j=1}^{N} p_{ij}(t)H(x_j).$$

Step 3, a node system kinetic equation is established according to the node kinetic equation:

$$\dot{X} = F(X) + \xi P(t)H(X).$$

Step 4, the node system kinetic equation is inputted to the complex environment model, to describe dynamic characteristics of the complex environment.

Figure 3:
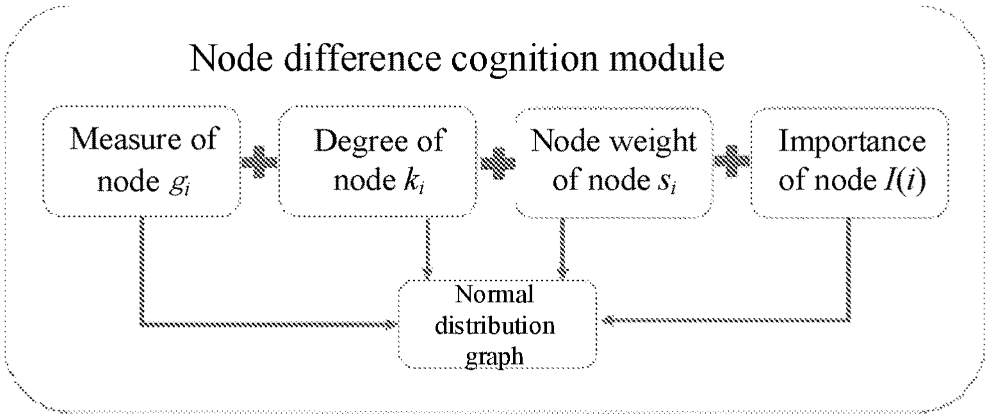
FIG. 3 is a structural diagram of a node difference cognition module.

As shown in FIG. 3, the node difference cognition module structure expresses differences of the network nodes by jointly using four parameters of the nodes in the complex environment model: measure $g_i$, degree $k_i$, node weight $s_i$, and importance I(i), and performs differentiated analysis on all the nodes by using a normal distribution graph, to implement differentiated cognition of the nodes.

Figure 4:
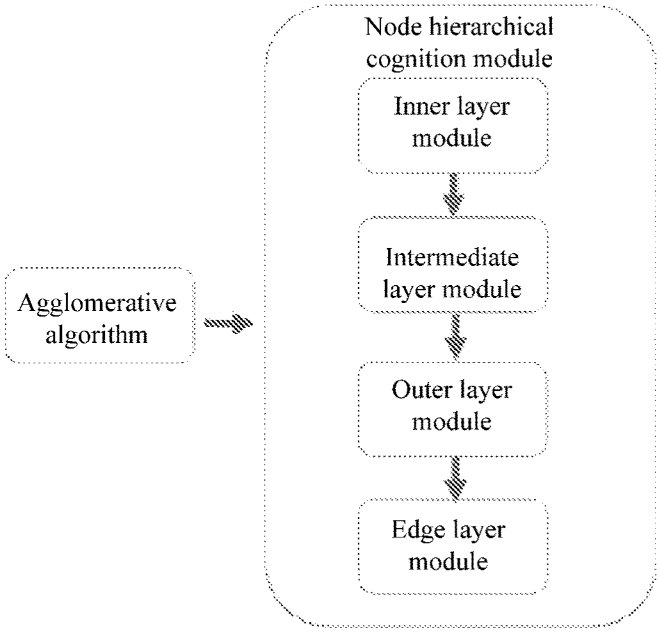
FIG. 4 is a flowchart of a hierarchical cognition module structure.

FIG. 4 shows a flowchart of a hierarchical cognition module structure. The nodes in the complex environment model are hierarchized by using an agglomerative algorithm. The nodes in the complex environment model are sequentially grouped to form an inner layer module, an intermediate layer module, an outer layer module, and an edge layer module, to implement hierarchical cognition of the complex environment.

Figure 5:
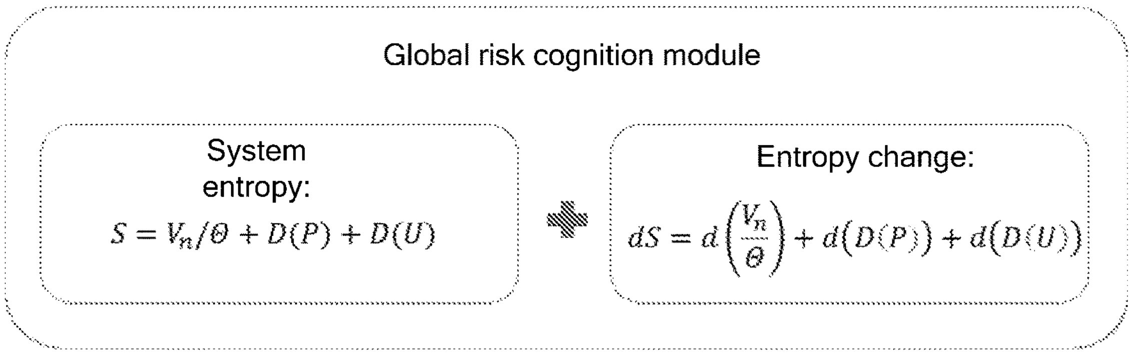
FIG. 5 is a structural diagram of a global risk cognition module.

As shown in FIG. 5, the global risk cognition module structure uses system entropy: $S=V_n/\Theta+D(P)+D(U)$ and an entropy change:

$$dS = d\left(\frac{V_n}{\Theta}\right) + d(D(P)) + d(D(U))$$

jointly to measure a disorder degree of the complex environment model, and an overall risk and changing trend are described, to implement global common state cognition of the complex environment.

Figure 6:
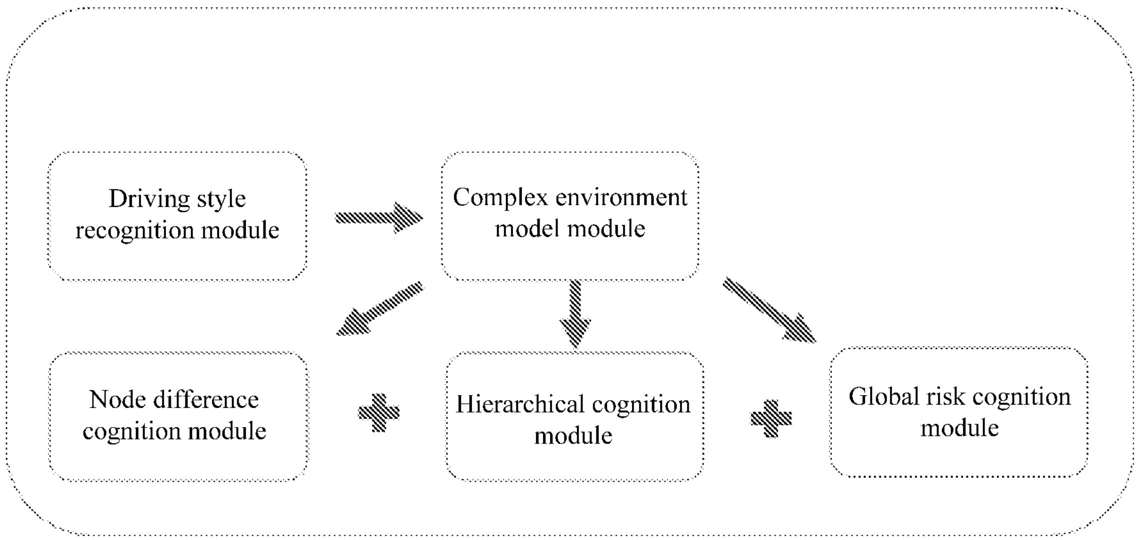
FIG. 6 is a schematic structural diagram of a complex network-based cognition system of an autonomous vehicle.

As shown in FIG. 6, the complex network-based cognition system of an autonomous vehicle according to the present disclosure includes a driving style recognition module, a complex environment model module, a node difference cognition module, a hierarchical cognition module, and a global risk cognition module. The driving style recognition module inputs a recognized driving style into the complex environment model module, to construct an inter-node inline function $H(x_j)$; the node difference cognition module, the hierarchical cognition module, and the global risk cognition module receives data of V, B, X, P, Θ parameters in the complex environment model module, to implement differentiated node cognition, hierarchical cognition, and global risk cognition respectively.

A complex network-based cognition method of an autonomous vehicle includes the following steps.

Step 1): A longitudinal driving characteristic parameter, a lateral driving characteristic parameter, and a mode shift characteristic parameter are extracted, a driving style characteristic matrix $C_J$ is constructed, a random forest classifier $R_f$ is generated, the driving style characteristic matrix $C_J$ is inputted into the random forest classifier $R_f$, a driving style category $K_{drive}$ is outputted through the random forest classifier $R_f$, and a driving style is recognized as an aggressive category, a peaceful category, or a conservative category. Step 1) specifically includes the following steps.

(A) A longitudinal driving characteristic parameter, a lateral driving characteristic parameter, and a mode shift characteristic parameter are extracted.

(B) A driving style characteristic matrix $C_J$ is constructed.

(C) A random forest classifier $R_f$ is generated.

(D) The driving style characteristic matrix $C_J$ is inputted into the random forest classifier $R_f$, a driving style category $K_{drive}$ is outputted through the random forest classifier $R_f$, and a driving style is recognized as an aggressive category, a peaceful category, or a conservative category.

Step 2): A time-varying complex dynamical network G is constructed as a complex environment model, to describe overall correlation characteristics of a complex environment; a node kinetic equation in the complex environment model is further established; then a dynamical equation vector F(X) of all the nodes in the time-varying complex dynamical network G, a coupling matrix P(t) of the nodes in the time-varying complex dynamical network G, and a node inline vector H(X) are combined, to establish a node system kinetic equation of the time-varying complex dynamical network G to describe dynamic characteristics of the complex environment. Step 2) specifically includes the following steps.

(A) A time-varying complex dynamical network G is constructed as a complex environment model.

(B) A node kinetic equation in the complex environment model is established based on parameters in the complex environment model.

(C) A node system kinetic equation of the time-varying complex dynamical network G is established based on the node kinetic equation to describe dynamic characteristics of the complex environment.

Step 3): Four parameters of the nodes in the complex environment model are constructed: measure $g_i$, degree $k_i$, node weight $s_i$, and importance I(i), and differentiated analysis is performed on all the nodes by using a normal distribution graph, to implement differentiated cognition of the nodes. Step 3) specifically includes the following steps.

(A) Four parameters of the nodes in the complex environment model are constructed: measure $g_i$, degree $k_i$, node weight $s_i$, and importance I(i).

(B) All the nodes in the complex environment model are described by using the foregoing four parameters.

(C) Differentiated analysis are performed on all the nodes by using a normal distribution graph, to implement differentiated cognition of the nodes.

Step 4): The nodes in the complex environment model are hierarchized by using an agglomerative algorithm, to implement hierarchal, stepped cognition of the complex environment of the autonomous vehicle. Step 4) specifically includes the following steps.

(A) With the autonomous vehicle as a central node, an inner layer module is formed by using the central node and nodes having a coupling relationship with the central node.

(B) Importance of non-central nodes in the inner layer module is sorted, and a node with a maximum coupling coefficient sequentially is looked for, to form an intermediate layer module.

(C) Importance of the nodes in the intermediate layer module is sorted, and a node with a maximum coupling coefficient sequentially is looked for, to form an outer layer module.

(D) An edge layer module is formed by using other nodes.

Step 5): A disorder degree of the complex environment model is measured by using system entropy and an entropy change according to a basic idea of an entropy theory, and an overall risk and changing trend is described, to implement global common state cognition. Step 5) specifically includes the following steps.

(A) System entropy $S=V_n/\Theta+D(P)+D(U)$ is used to measure a disorder degree of the complex environment model, and describe an overall risk of the complex environment.

(B) An entropy change $dS=d(V_n/\Theta)+d(D(P))+d(D(U))$ is used to measure the disorder degree of the complex environment model, and describe a changing trend of the overall risk of the complex environment, to implement global common state cognition.

Specific embodiment of the present disclosure: a driving style recognition module is compiled using Python, a driving style characteristic matrix $C_J$ is constructed based on a Scikit-learn third-party machine learning library, and a random forest classifier $R_f$ is generated, to implement driving style recognition; a mathematical model is compiled with MATLAB/Simulink to construct a complex environment model module; a node difference cognition module, a hierarchical cognition module, and a global risk cognition module are compiled using Python, to implement a differentiated and hierarchical global risk cognition method for a complex environment of an autonomous vehicle in the PyTorch framework; MATLAB, Scikit-learn, and PyTorch interfaces are compiled based on a Ubuntu system, and are installed are configured in an industrial control computer, to implement the complex network-based complex environment model, cognition method, and cognition apparatus of an autonomous vehicle.

The series of detailed descriptions listed above are only specific illustration of feasible examples of the present disclosure, rather than limiting the claimed scope of the present disclosure. All equivalent manners or changes made without departing from the technical spirit of the present disclosure should be included in the claimed scope of the present disclosure.

What is claimed is:

1. A cognition method using a complex network-based cognition system of an autonomous vehicle, comprising the following steps:

step 1): by a control computer, extracting a longitudinal driving characteristic parameter, a lateral driving characteristic parameter, and a mode shift characteristic parameter, constructing a driving style characteristic matrix $C_J$, generating a random forest classifier $R_f$, inputting the driving style characteristic matrix $C_J$ into the random forest classifier $R_f$, outputting a driving style category $K_{drive}$ through the random forest classifier $R_f$, and recognizing a driving style as an aggressive category, a peaceful category, or a conservative category;

step 2): by the control computer, constructing a time-varying complex dynamical network G as a complex environment model, to describe overall correlation characteristics of a complex environment; further establishing a node kinetic equation in the complex environment model; then combining a dynamical equation vector F(X) of all the nodes in the time-varying complex dynamical network G, a coupling matrix P(t) of the nodes in the time-varying complex dynamical network G, and a node inline vector H(X), to establish a node system kinetic equation of the time-varying complex dynamical network G to describe dynamic characteristics of the complex environment;

step 3): by the control computer, constructing four parameters of the nodes in the complex environment model: measure $g_i$, degree $k_i$, node weight $s_i$, and importance I(i), and performing a differentiated analysis on the nodes by using a normal distribution graph, to implement a differentiated cognition of the nodes;

step 4): by the control computer, hierarchizing the nodes in the complex environment model by using an agglomerative algorithm, to implement a hierarchal, stepped cognition of the complex environment of the autonomous vehicle; and step 5): by the control computer, measuring a disorder degree of the complex environment model by using system entropy and an entropy change according to a basic idea of an entropy theory, and describing an overall risk and a changing trend, to implement a global common state cognition.

2. The cognition method according to claim 1, wherein the complex network-based cognition system comprises a driving style recognition module, a complex environment model module, a node difference cognition module, a hierarchical cognition module, and a global risk cognition module, wherein the driving style recognition module is configured to construct the driving style characteristic matrix $C_J$ based on an extraction of driving characteristic parameters, input the driving style characteristic matrix $C_J$ to the random forest classifier $R_f$, and output the driving style category $K_{drive}$ through the random forest classifier $R_f$;

the complex environment model module is a complex environment model, wherein the complex environment model comprises:

the time-varying complex dynamical network G constructed as the complex environment model by using motion bodies as nodes:

$$G=(V,B,X,P,\Theta)$$

wherein G is the time-varying complex dynamical network; V is a set of the nodes in the time-varying complex dynamical network G; B is a set of edges in the time-varying complex dynamical network G, and represents inter-node connection lines; X is a state vector of a node in the time-varying complex dynamical network G; P is an intensity function of an edge in the time-varying complex dynamical network G, and represents an inter-node coupling relationship; Θ is an area function of the time-varying complex dynamical network G, and represents a dynamic constraint for the time-varying complex dynamical network G;

the time-varying complex dynamical network G is equated to a continuous-time dynamical system with N nodes; assuming that a state variant of an i-th node is $x_i$, a kinetic equation of the i-th node is:

$$\dot{x}_i=f(x_i)+\xi\sum_{j=1}^{N}p_{ij}(t)H(x_j),\ (i=1,2,\ldots,N)$$

wherein $f(x_i)$ is an argument function of the state variant of the i-th node; $\xi>0$ is a strength coefficient of a common connection relation; $p_{ij}(t)$ is a coupling coefficient between the i-th node and a j-th node; $H(x_j)$ is an inter-node inline function, and is a function about the driving style and a node distance;

defining $X=[x_1, x_2, \ldots, x_N]^T$, $F(X)=[f(x_1), f(x_2), \ldots, f(x)]^T$, $P(t)=[(p_{ij}(t))]\in R^{N\times N}$, and $H(X)=[H(x_1), H(x_2), \ldots, H(x_N)]^T$, a node system kinetic equation of the time-varying complex dynamical network G is as follows:

$$\dot{X}=F(X)+\xi P(t)H(X)$$

wherein X is the state vector of the node in the time-varying complex dynamical network G; F(X) is a dynamical equation vector of the node in the time-varying complex dynamical network G; P(t) is a coupling matrix of the nodes in the time-varying complex dynamical network G; H(X) is a node inline vector in the time-varying complex dynamical network G; and in the complex environment model, with a movement of the nodes and a change of an environment, positions and states of the nodes change dynamically, and there are nodes entering and flowing out of the time-varying complex dynamical network, the inter-node coupling relationship and the area function of the time-varying complex dynamical network change accordingly, and a complex network system continuously evolves over time;

the node difference cognition module is configured to express the differences of the network nodes by using the four parameters of the nodes in the complex environment model: the measure $g_i$, the degree $k_i$, the node weight $s_i$, and the importance I(i), and perform the differentiated analysis on all the nodes by using the normal distribution graph;

the hierarchical cognition module is configured to hierarchize the nodes in the complex environment model by using the agglomerative algorithm, to implement the hierarchical, stepped cognition of a complex environment of the autonomous vehicle; and the global risk cognition module is configured to measure the disorder degree of the complex environment model by using the system entropy and the entropy change, and describe the overall risk and the changing trend, to implement the global common state cognition.

3. The cognition method according to claim 2, wherein the driving characteristic parameters comprise the longitudinal driving characteristic parameter, the lateral driving characteristic parameter, and the mode shift characteristic parameter; and the longitudinal driving characteristic parameter refers to a longitudinal acceleration $a_+$ and a vehicle-following time interval $d_{time}$ within a limited time window; the lateral driving characteristic parameter refers to a lateral acceleration root mean square RMS ($a\_$) and a yaw angular velocity standard deviation SD(r) within a limited time window; and the mode shift characteristic parameter refers to a left-lane-switching state transfer probability $P(l_c)$ and a right-lane-switching state transfer probability $P(r_c)$ within a limited time window.

4. The cognition method according to claim 2, wherein the driving style characteristic matrix $C_J$ is a 3D characteristic matrix with six degrees of freedom consisting of a longitudinal driving characteristic parameter, a lateral driving characteristic parameter, and a mode shift characteristic parameter:

$$C_J=\begin{bmatrix}a_+,\ d_{time}\\ \mathrm{RMS}\,(a_-),\ SD(r)\\ P(l_c),\ P(r_c)\end{bmatrix}.$$

5. The cognition method according to claim 2, wherein the random forest classifier $R_f$ is generated through the following steps: performing a random sampling with a replacement on an original training set consisting of driving style data, to generate training sets; selecting n characteristics for each training set, and training m decision tree classification models separately; for each decision tree classification model, selecting a best sample characteristic according to an information gain ratio and splitting the best sample characteristic, until all training samples belong to a same category;

finally, combining all the generated decision tree classification models to form a random forest, and outputting the driving style category $K_{drive}$ through a voting method, wherein the driving style category $K_{drive}$ comprises the aggressive category, the peaceful category, and the conservative category:

$$K_{drive} = R_f(C_J).$$

6. The cognition method according to claim 2, wherein the measure $g_i$ of the node is represented by using a structure size of the i-th node;

the degree $k_i$ of the node is represented by using a quantity of nodes directly connected to the i-th node;

the node weight $s_i$ of the node represents a sum of edge weights of all neighboring edges of the i-th node;

the importance I(i) of the node is as follows:

$$I(i) = K(i) + \sum_j p_{ij}(t)$$

wherein $p_{ij}(t)$ is an inter-node coupling coefficient, and K(i) is a degree centrality factor of the i-th node; and $$K(i) = \frac{k_i w_{ij}}{\langle k \rangle \overline{U}}$$

wherein $\langle k \rangle = \Sigma k_i/N$, and represents an average degree of a module; and $\overline{U} = \Sigma(s_i/k_i)/N$, and represents an average unit weight of the module.

7. The cognition method according to claim 2, wherein in the hierarchical cognition module, firstly, with the autonomous vehicle as a central node, an inner layer module is formed by using the central node and nodes having a coupling relationship with the central node; secondly, importance of non-central nodes in the inner layer module are sorted, and a node with a maximum coupling coefficient is looked for sequentially, to form an intermediate layer module; then, importance of the nodes in the intermediate layer module is sorted, and a node with a maximum coupling coefficient is looked for sequentially, to form an outer layer module; and finally, other nodes form an edge layer module.

8. The cognition method according to claim 2, wherein in the global risk cognition module, the system entropy is designed as follows:

$$S = V_n / \Theta + D(P) + D(U)$$

wherein $V_n$ is a quantity of nodes in the complex environment model, Q is a network area of the complex environment model, D(P) represents a variance of coupling coefficients, and D(U) is a variance of speeds of the nodes in the complex environment model;

the entropy change is designed as follows:

$$dS = d\left(\frac{V_n}{\Theta}\right) + d(D(P)) + d(D(U))$$

wherein d represents a differential of a corresponding variant, and represents a change trend of the corresponding variant.

* * * * *